Figure 4:
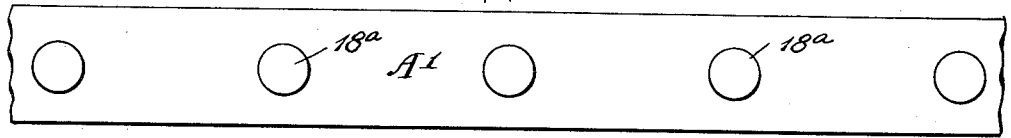

Oct. 28, 1930.                M. FEYBUSCH                1,779,425
           METHOD AND APPARATUS FOR HANDLING SMALL ARTICLES
                    Filed May 10, 1927       2 Sheets-Sheet 1
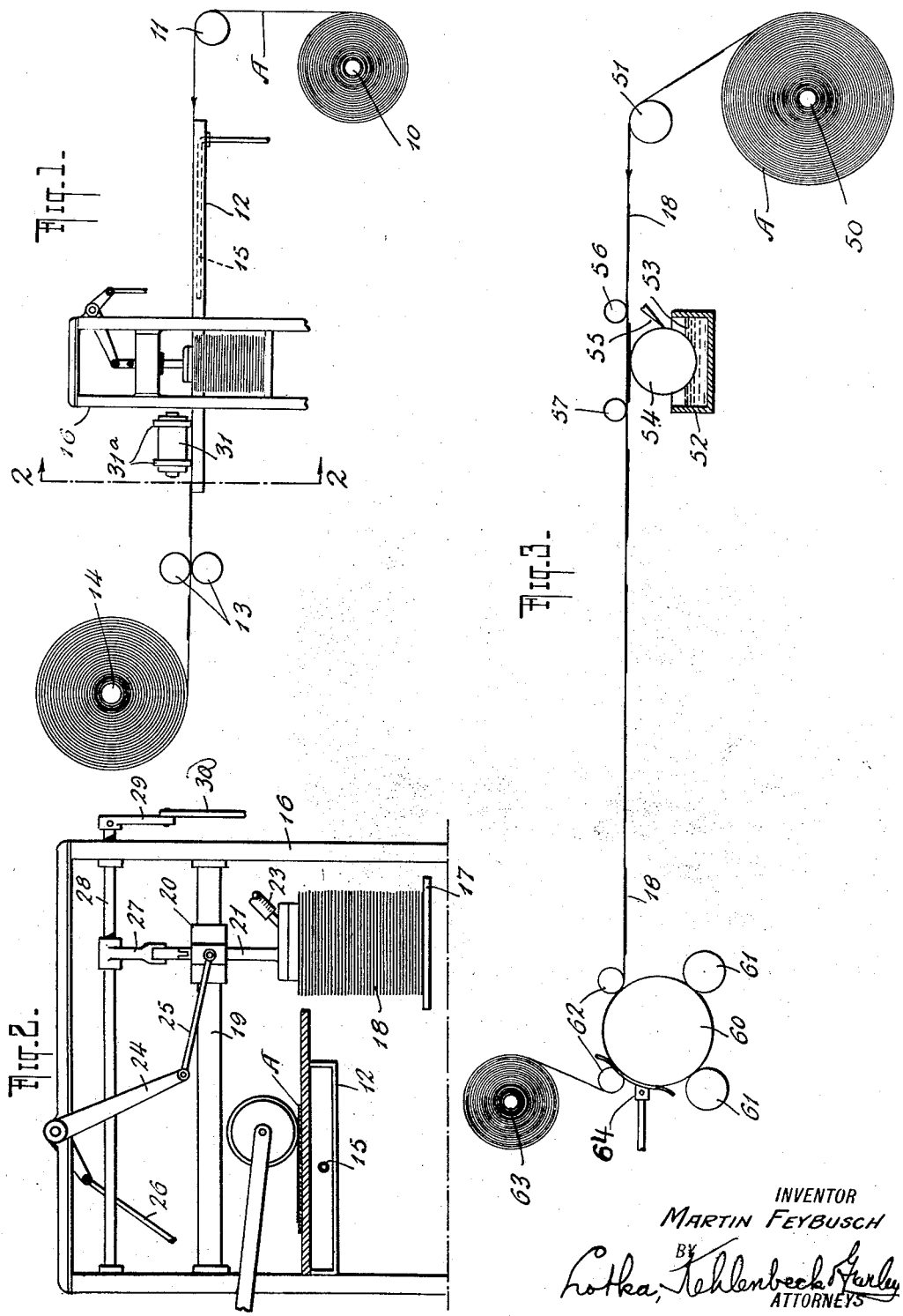

Oct. 28, 1930.  M. FEYBUSCH  1,779,425
METHOD AND APPARATUS FOR HANDLING SMALL ARTICLES
Filed May 10, 1927  2 Sheets-Sheet 2

INVENTOR
MARTIN FEYBUSCH
BY
Lotka, Kehlenbeck Harle
ATTORNEYS

Patented Oct. 28, 1930

1,779,425

UNITED STATES PATENT OFFICE

MARTIN FEYBUSCH, OF BROOKLYN, NEW YORK

METHOD AND APPARATUS FOR HANDLING SMALL ARTICLES

Application filed May 10, 1927. Serial No. 190,369.

This invention relates to handling or conveying apparatus and methods and has for its principal object to provide a new and improved method for handling and conveying articles, especially small articles which are required to be delivered singly at a certain place or station.

In the handling of many different kinds of small articles which must be conveyed to a certain station where an operation is to be performed upon such articles, as for example, associating them or securing them singly to another article, the provision of suitable inexpensive but efficient conveying means has been a problem of considerable difficulty, particularly when the associating or securing of the small article is performed by an automatic machine effective at predetermined time intervals to perform the required operation. As an example of such an operation, the securing of labels, or the like, to articles such as cans, bottles, boxes, or other merchandise may be cited.

While for the purpose of this application the invention will be described in connection with a label affixing operation, it will be understood that the principles of the invention are not limited to any particular operation, but that such principles are applicable broadly to many different classes of merchandise or articles and to many different operations.

Considering the invention from the standpoint of its use in connection with the operations of handling and affixing of labels to cans, bottles, boxes, etc., attention is called to the fact that in such operations many difficult problems are encountered, among which the following may be noted: Certain types of labels, for example, lithographed labels can not be supplied with the present day methods of production in any form other than as separate sheets. Although the labels may be printed either singly, or in sheets consisting of several labels, which are subsequently separated, in either case, the labels must be handled separately.

The handling of the separate labels, feeding, gumming and affixing them to the articles presents many difficulties, and therefore many different types of feeding and conveying devices are employed, all of which have certain objectionable features. For example, if chain conveyers provided with gripping fingers which grip the side edges of the labels are employed, it is necessary to leave ungummed the margins of the sheets or labels where they are gripped by the gripping fingers. If a suction feeding plate is employed, it is necessary to have a separate suction plate for each different size or shape of label, thereby not only increasing the cost of the necessary equipment for handling different jobs, but also requiring the changing of the suction plates for each different job, which changing often involves in turn changing many other parts and adjustments which can be made only by highly skilled, specially trained mechanics. In addition, the feeding of separate labels singly, particularly when done with automatic feeding means, makes it necessary to use more or less complicated feeding mechanisms usually having a large number of reciprocating parts. In any machine in which reciprocating parts are employed to a great extent, the speed of the machine is necessarily limited, if excessive vibration and wear is to be avoided.

Therefore, it is highly desirable that the labels or other sheets which are to be affixed to an article be fed to the article in a continuous web. Many types of automatic gumming machines have been invented and are used commercially, in which the feeding mechanism is designed for handling the labels or sheets in web form, but such machines can not be used for labels, such as lithographed labels, which must be handled singly. The problem of devising a feeding mechanism which could handle and feed labels in either single sheets or in web form, has been given considerable thought in the art relating to the gumming and affixing of labels, but no satisfactory solution has, as far as I am aware, ever been arrived at. Likewise, the problem of furnishing labels such as lithographed labels in web form has been given considerable consideration and has also remained unsolved.

The principal object of this invention is to provide a new and improved method by means of which any small articles such as labels, whether lithographed or not, which are required to be delivered separately to an article, may be associated or combined with a web of suitable material, to which the articles are semi-permanently secured or affixed in any desired spaced relationship, and by means of which web the labels or other small articles may be conveyed and fed directly to the merchandise to which they are to be applied or with which they are to be associated.

Briefly stated, the present invention has for its broad underlying principle the use of a web of material which may be coated throughout its entire length on both sides, on one side only throughout its entire length, in spaced strips, or at spaced intervals, with any suitable moisture-repellant non-hygroscopic material, such for example, as beeswax, paraffine, tallow, sealing wax or other similar substances which are normally non-adhesive, but which can be treated in a simple manner, for example, by a slight heating to bring them to a condition such that an article brought or pressed into contact with the coating formed by such substances will be caused to adhere to the web with what may be termed a "semi-permanent" adhesion. The particular material selected for coating the web must be such that while it can, by a simple treatment be made adhesive, the degree of adhesion must not be so great that the article can not be readily removed or disengaged from the web by a very slight simple manipulation, although the article should remain stuck to the web securely enough to hold it to the web against accidental or unintentional separation therefrom. While I have enumerated above the number of substances which would be satisfactory for a coating material for the web, the invention is not to be considered as limited in its application to the use of the substances so enumerated, as any other materials not enumerated but having similar properties obviously may be employed.

I am aware that it has been proposed to use a web or endless band of material for the feeding of labels or the like to the articles to which such labels are to be affixed, either the labels or the web being coated with paste or glue on their contacting surfaces, and the labels being wiped or peeled off the web before the glue has thoroughly set. Such proposal, however, has never, as far as I am aware, been put into commercial use, as the use of paste or glue for such purpose is highly impractical. It has also been proposed to use an endless web or band provided with a plurality of apertures through which suction is exerted to hold the labels to the band. This proposal is also impractical, because of the difficulty of securing sufficient suction throughout the entire length of the endless band and the practically prohibitive, high cost of manufacturing such a device. I am further aware that it has been proposed to supply postage stamps in perforated strips formed into a roll with a strip of waxed paper incorporated in the roll next to the gummed side of the stamps. Postage stamps and the like have also been supplied in separated condition, rolled in a strip of waxed paper at spaced intervals to be delivered to a moistening and stamp affixing device. The use of the wax coating paper in the last two instances is, however, for an entirely different purpose than that contemplated by the present invention. In my invention, the wax or similar coating material is employed in order to make use of the property of such material by means of which it is capable of being made adhesive under certain conditions, whereas in the instances of wax coated paper in the prior art, the wax coating was employed entirely for the purpose of preventing adhesion.

For the purpose of the present application, I have shown the invention in connection with an apparatus for gumming and affixing the labels to cans. A satisfactory example of such an apparatus is shown more or less diagrammatically in the accompanying drawings, wherein Fig. 1 is a side elevation of a device for securing the labels in any desired spaced relationship to the coated web; Fig. 2 is a section taken substantially on the line 2—2 of Fig. 1, and Fig. 3 is a side elevation indicating somewhat diagrammatically the operation of gumming the labels, conveying them to a station to which the cans are fed, and affixing them to the cans; Figs. 4 to 9 inclusive are plan views illustrating various constructional examples of coated webs and the manner in which labels may be secured to such webs.

As shown in Figs. 1 to 3 of the drawing, a web A of paper or other suitable material is mounted in a rolled form upon a supply roller shaft 10. The web is led from the supply roll thereof over an idler 11 and across a table 12. A pair of feeding or drawing rollers 13 are provided for drawing the web from the supply roll and feeding it to a take-up roll having a shaft 14, which may be driven by any suitable means (not shown). The table 12 is preferably in the form of a jacketed or hollow structure, the interior of which is heated by any suitable means, such, for example, as the steam pipe or coil 15. A supporting frame 16 straddles the table 12 and has associated therewith a platform 17 for holding a stack of labels 18. Mounted within the vertical legs of the supporting framework 16 is a transverse shaft 19, upon which is slidably mounted a sleeve 20. The sleeve 20 is provided with a vertically extending bearing, in which the shank 21 of a suction feed plate 22 is slidably mounted. The feed plate 22 is connected by means of the pipe 23 with any suitable source of suction, in accordance with the usual construction of devices of this character. Means are provided to actuate the suction feed plate 22 from a position in contact with the top label of the stack to a position in contact with the web A as such web passes over the heated table 12. Such means may, for example, comprise an oscillating crank arm 24 having one end thereof connected by means of the link 25 with the sleeve 20. The other end of the crank arm has connected thereto an actuating rod 26 which leads to any suitable driving or actuating means (not shown) by means of which the sleeve 20 is moved longitudinally of the rod 19 in the proper predetermined timed relationship. In addition to the movement transversely of the web A given to the suction plate 22, it also has imparted to it an up and down or vertical reciprocation, by means of a crank lever 27 secured to an oscillating rod 28; the latter being journaled in the vertical standards of the supporting frame 16 and being actuated by the crank arm 29 and actuating rod 30.

For the purpose of insuring a firm adhesion of the labels 18 to the web A, means are preferably provided to exert a pressure upon the labels after they have been transferred from the stack to the web A by means of the suction plate. Such means may comprise a roller 31, located between the supporting stand 16 and the feeding or drawing rollers 13.

The operation of the apparatus shown in Figs. 1 and 2 is substantially as follows: A web or roll of coated paper A is mounted upon the shaft 10 and the paper is fed through the apparatus and wound upon the shaft 14. The shaft 14 and rollers 13 may be driven continuously or intermittently, as desired. As the web passes over the heated table 12, the wax or other coating material thereon will be heated to a degree sufficient to soften the coating and bring it to a condition in which an article can be made to adhere thereto. The suction plate 22 being caused to operate, said plate will take the uppermost label 18 from the stack, raise it slightly to disengage it from the stack and carry it transversely to the web A upon the table 12. As the label is brought over the web A the suction will be released to cause the label to be deposited upon the slightly heated coating material. Assuming that an intermittent movement is given to the web, the label is carried thereby to a position in alignment with the roller 31, which is actuated, during a dwell of the conveyer, transversely across the web to press the label securely into engagement with the slightly heated, and therefore now adhesive coating material.

Figure 5:
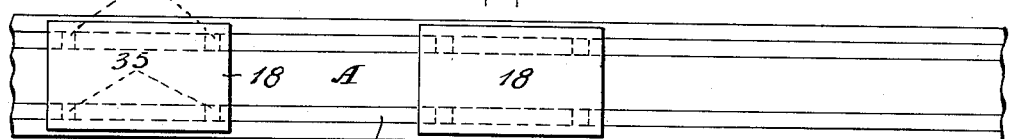

The web A shown in Fig. 1 may take any of the forms shown in Figs. 4 to 9 inclusive. In Fig. 4 I have shown the web A' as coated throughout its entire length, preferably on one side only, and carrying a plurality of small labels 18ª. In Fig. 5, the web A is shown as provided with a coating in the form of longitudinally extending, transversely spaced strips 40, of coating material. The web A shown in Fig. 5 may be assumed to be the web A shown in Figs. 1 to 3 of the drawing. When such a web provided with spaced coating strips 40 is used in connection with a roller, such as shown in Figs. 1 and 2, which roller it will be noted is provided with spaced flanges 31ª, the labels 18 will, as will be readily understood, be caused to adhere to the web at four spaced points, as indicated by the reference character 35 in Fig. 5.

Figure 6:
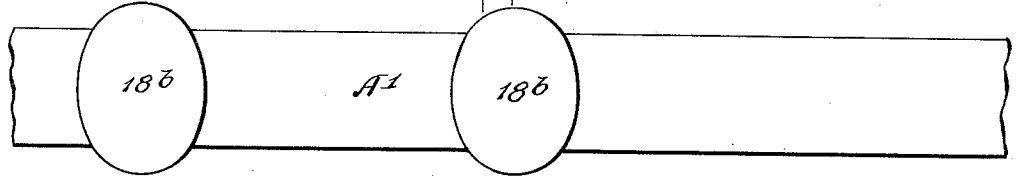

Fig. 6 shows a web A' of the same construction as shown in Fig. 4 coated throughout its entire length upon one side only and having labels 18ᵇ attached thereto, the width of the labels 18ᵇ being greater than the width of the web A'.

Figure 7:
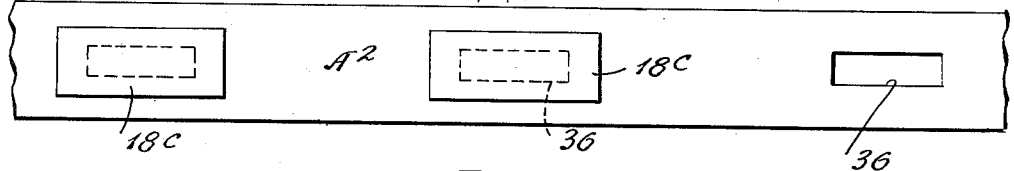

In Fig. 7 I have shown the web A² as provided at spaced intervals with cutout portions 36, which may be of any suitable size or shape. The labels 18ᶜ are secured to the web A² in such a manner as to lie over the cutout portions. The purpose of this construction is to enable any suitable plunger or the like to be engaged with the label 18ᶜ through the cutout portions 36 for the purpose of detaching the labels from the web A² and giving a preliminary pressure to force the labels into contact with the article to which they are to be secured.

Figure 8:
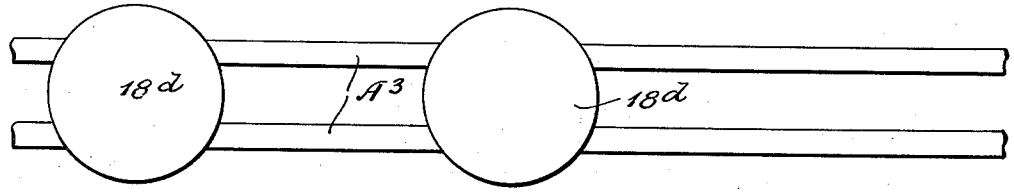

In Fig. 8 the web A³ is shown as consisting of two transversely spaced longitudinally extending narrow strips, to which the labels 18ᵈ are secured. In the form shown in this figure and also in Fig. 6, wherein the labels 18ᵇ and 18ᵈ overlap the side edges of the webs or conveyers A', A³, respectively, any suitable means may be employed for engagement with such overlapping edges to cause disengagement of the labels from the webs and force them into contact with the articles to which they are to be secured. The form shown in Fig. 8 similarly to Fig. 7 also enables means for detaching the labels from the web to be employed at the central part of the label.

Figure 9:
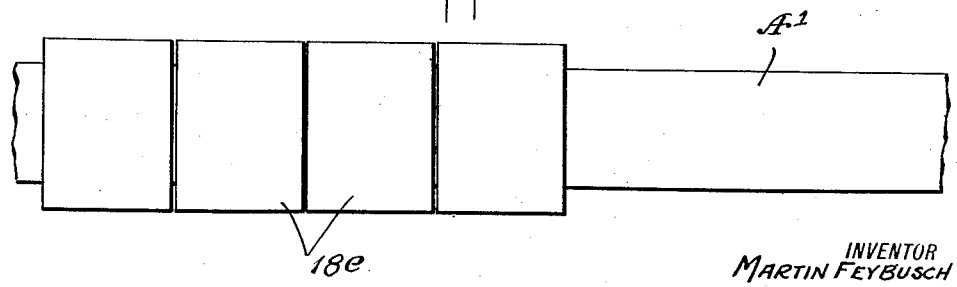

In Fig. 9 the web A' is the same as shown in Figs. 4 and 6 with the labels 18ᵉ placed thereon in close juxtaposition.

After the labels have been secured to the web A and the web carrying the labels secured thereto is wound upon the take-up shaft 14 in the form of a roll, the roll may then be transferred to the apparatus for gumming and affixing the label to the article. Fig. 3 of the drawing shows a simple form of such an apparatus. The web A is mounted upon the shaft 50 and is led therefrom over the idler roller 51 to a gumming device. The latter, shown in its simplest form, may consist of a glue or other adhesive holding trough 52, containing a supply of adhesive 53. A transfer or gum applying roll 54 dips into the adhesive contained in the trough 52 and applies it to the exposed under side of the labels. A doctor 55 of any suitable construction is provided for regulating the thickness of the adhesive coating on the roll 54. Idler rolls 56, 57 are provided for holding the web to the roll 54 and thereby insuring contact of the exposed faces of the labels with said roll 54. Obviously, as the web carrying the labels 18 passes over the transfer or applying roll 54, said labels will receive upon their exposed face a coating of adhesive. The web carrying the labels 18 then passes to a station where the labels are applied to the article to which they are to be affixed. For the purpose of the present application, I have selected as an illustrative example, one in which the labels are applied to a can, indicated by the reference character 60. The can 60 rests upon a pair of can rotating rollers 61. These rollers 61 are rotated by any suitable means in accordance with the usual construction of devices of this character. A pair of rollers 62 rest upon the upper side of the can and serve to hold the can against the rollers 61 with sufficient pressure to insure its rotation by the last named rollers. The rollers 62 also serve to guide the web A with its lower face pressed securely against the cylindrical wall of the can. After passing the roller 62, the web is turned about the farthest of said rollers and directed upwardly to be wound upon a take-up shaft 63.

The operation of the device shown in Fig. 3 will be readily understood. The labels 18 as they are led over the gum applying roller 54 will receive a coating of glue upon their exposed faces. As the gummed outer surfaces of the labels come into engagement with the can 60, the labels will adhere to the can and as the web is turned sharply upwards after passing the zone of engagement between the periphery of the farthest roller 62 with the can 60, the web will be peeled or separated from the label. The degree of adhesion of the wax or other coated surface of the web will be considerably less than the degree of adhesion between the gummed surface of the label with the can. Consequently, the labels 18 will remain securely fixed to the can while the web will separate readily from the labels.

A mechanical detaching device, such, for example, as indicated diagrammatically in Fig. 3 by the reference numeral 64, may be employed, particularly in connection with such combinations of webs and labels, as shown in Figs. 6, 8 and 9 for stripping the labels from the web and applying it to the article.

It will be noted that the use of the web A for conveying the labels 18 to the label affixing device enables a space of any desired distance to be provided between the adhesive applying mechanism and the label affixing machine. This is a factor of very great importance in the art of gumming and affixing labels, because it is of the utmost importance that the label be given sufficient time after the glue has been applied thereto to permit the glue to acquire the proper degree of "tackiness". It will be obvious that any desired predetermined timed interval between the point of coating the label with adhesive and the point of affixing the label to the article can readily be secured either by altering the distance between the gum applying device 52 and the station at which the labels are applied to the article or by varying the speed of travel of the web.

The constructional details of the means for feeding and securing the labels or other articles to the coated web may be varied, according to the particular nature of the articles which are to be secured to the web, therefore, the feeding means shown in Figs. 1 and 2 is to be construed merely as a more or less diagrammatic example. Many devices for feeding labels or sheets separately are well known in the art and obviously any such device may be employed. The same is also true with respect to the glue applying device and the label affixing means shown in Fig. 3 of the drawing. Devices of these types are well known and common, and any suitable construction may be used.

While I have shown in Fig. 1, an application of the principles of the invention in which the labels are transferred from a stack to a coated web, which is subsequently wound into a roll, it will be obvious that the invention is not limited to this particular method of handling the labels, but that the web could be arranged to receive the labels directly from a printing or lithographing press. It will also be obvious it is not essential to wind the web into a roll after the labels have been fixed to such web, but that the web could be led directly to the gum applying device and label affixing machine directly, without winding it into a roll form.

It will further be understood that the coating may be applied to a web of plain paper or other suitable material, by means of a roller or other suitable device, immediately before the labels are brought into contact with the web. That is to say, the invention is not limited in its application to the use of a web of paper which has been coated in any particular manner as a separate operation from that of securing the labels or other articles to the web.

Although it would not ordinarily be necessary to do so, a slight application of heat may be resorted to, to facilitate the separation of the labels from the web at the point where the labels are to be affixed to the article.

While I have described and illustrated the invention as applied to an operation of gumming and affixing labels, it will be readily appreciated that the principles are of very much broader application than the particular example selected for illustration herein. Many different types of small articles obviously may be secured to a web of material, by means of a coating substance of the type herein disclosed. Likewise, many different types of operations could be performed upon such articles in associating them with other articles of merchandise.

It will be understood that the coating may be applied either to the web or the face of the sheets or other articles, and that no matter how applied, that is to say, whether a roll of web is first provided with a coating which is subsequently unrolled and heated to bring the coating to a viscous, adhesive condition, or the coating is applied to the roll and the sheets are secured to the coating immediately, or the coating is applied to the article which is then brought into contacting engagement with the web, the coating obviously may be applied either over the entire surface of the web or articles, or at spaced intervals upon the web or the articles. In many cases a single small coated area only may be employed for each article. Thus, it will be understood that the different types of conveyer webs shown in Figs. 4 to 9 are merely indicative of only a few of the many forms of conveyer constructions that may be employed, and that the showings of said figure are not to be considered as limiting the invention to the particular constructions shown, it being obvious that many variations, changes and modifications may be resorted to without departing from the principles of my invention.

I claim:

1. In the art of handling small separate articles, the improvement which consists in securing the separate articles in spaced relationship upon a web by a coating of a moisture repellant, normally non-adhesive material, capable of being treated to bring it to a viscous adhesive condition, treating the coating to bring it to such condition, pressing said articles, web and coating into contacting engagement, while said coating is in such viscous condition, and transporting said web with said articles secured thereto to a predetermined place.

2. In the art of handling small separate articles, the improvement which consists in securing the separate articles at spaced points thereof to a web by a coating of a moisture repellant, normally non-adhesive material, capable of being treated to bring it to a viscous adhesive condition, treating the coating to bring it to such condition, pressing said articles, web and coating into contacting engagement while said coating is in such viscous condition and transporting said web with said articles secured thereto to a predetermined place.

3. In the art of handling small separate articles, the improvement which consists in detachably securing the separate articles at spaced points thereof to a web by a coating of a moisture repellant, normally non-adhesive material, which possesses the property of becoming adhesive when heated, heating said material to bring it to an adhesive condition, pressing said articles, coating and web into contacting engagement while said coating is in such condition, and transporting said web with said articles secured thereto to a predetermined place and removing the articles from said web at said place.

4. In the art of handling small articles, the improvement which consists in securing the separate articles in spaced relationship upon a web by a coating of wax, pressing said articles, web, and wax coating into intimate contacting relationship while said wax is in a heated condition, and transporting said web with said articles secured thereto to a predetermined place.

5. The method of affixing sheets to articles, which consists in securing one face of the sheets to a web by means of a coating of a normally non-adhesive, moisture-repellant material, capable of being brought to an adhesive condition, pressing said sheets, coating and web into contacting engagement, moving said web with the sheets secured thereto, applying a coating of adhesive to the exposed faces of said sheets, separating said sheets from said web and affixing the gummed sides thereof to said articles.

6. The method of affixing sheets to articles, which consists in securing the sheets to a web by means of a coating of a normally non-adhesive, moisture-repellant material having the property of becoming adhesive when heated, heating said material to bring it to an adhesive condition, pressing said web, coating and sheets into close contacting engagement while said coating material is in such heated condition, conveying said web with said sheets secured thereto to an affixing station, applying a coating of adhesive to the exposed faces of said sheets in their travel, separating said sheets from said web after the elapse of a predetermined time interval, and pressing the gummed side of said sheets into engagement with said articles.

7. The method of affixing sheets to articles, which consists in securing said sheets to a web by means of a coating of heated wax, conveying said web, with said sheets secured thereto, to a distant station, applying a coating of adhesive to the exposed faces of said sheets, separating said sheets from said web and pressing said sheets against said articles to cause the gummed side thereof to adhere to said articles and to be separated from said web.

8. The method of affixing sheets to articles, which consists in securing said sheets at spaced intervals to a web by means of wax heated to a viscous condition, pressing said sheets, web and wax into contacting engagement while the latter is in such condition, conveying said web with said sheets secured thereto through an adhesive applying device to coat the exposed surfaces of said sheets with adhesive, and thence to a station located at a distance from said adhesive applying device, separating said sheets from said web at such station and applying pressure to said sheets to cause the gummed sides thereof to adhere to said articles.

9. In an apparatus for affixing sheets to articles, a web having a coating of a moisture-repellant, normally non-adhesive, material, adapted to become adhesive when heated, means to apply heat to said coating, a feeding device to feed separate sheets to said web at spaced intervals, and a pressure applying device for pressing said sheets into engagement with said coating while the latter is in the adhesive condition.

10. In an apparatus for affixing sheets to articles, a web having a coating of a moisture-repellant, normally non-adhesive, material, adapted to become adhesive when heated, means to apply heat to said coating, a feeding device to feed separate sheets to said web at spaced intervals, and a pressure applying device for pressing said sheets into engagement with said coating while the latter is in the adhesive condition, and a device for removing the sheets from said web and applying them to said articles.

11. In apparatus for handling sheets, a conveyer web having in spaced areas on one side thereof a coating of wax, by means of which a plurality of sheets may be secured at spaced intervals to said web.

12. In apparatus for handling sheets, a conveyer web having in spaced areas on one side thereof a coating of wax by means of which a plurality of sheets may be secured to said web, said web having openings between said areas whereby the under side of each sheet is exposed upon the uncoated side of the web for permitting sheet removing means to be engaged with the face of the sheet which contacts with the coated face of the conveyer.

13. In apparatus for handling independent small articles, a conveyor web having an exposed coating of wax on one side thereof, by means of which a plurality of sheets of material are adapted to be adhesively secured in temporary connection with said web for exposing one surface of said sheets to receive an adhesive whereby the latter are permanently attached to other articles, and whereby said adhesively coated sheets are transported to a predetermined place for detachment from said web and attachment by means of said adhesive to said other articles.

In testimony whereof I have hereunto set my hand.

MARTIN FEYBUSCH.